United States Patent
Johnson

(10) Patent No.: US 6,681,559 B2
(45) Date of Patent: Jan. 27, 2004

(54) THRUST REVERSER POSITION DETERMINATION SYSTEM AND METHOD

(75) Inventor: Andrew T. Johnson, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/199,020

(22) Filed: Jul. 19, 2002

(65) Prior Publication Data

US 2003/0019206 A1 Jan. 30, 2003

Related U.S. Application Data

(60) Provisional application No. 60/307,527, filed on Jul. 24, 2001.

(51) Int. Cl.$^7$ .................................. F02K 3/06
(52) U.S. Cl. ......................... 60/204; 60/226.3
(58) Field of Search ................ 60/204, 226.3; 244/110 B; 239/265.31

(56) References Cited

U.S. PATENT DOCUMENTS

| | | |
|---|---|---|
| 1,175,346 A | 3/1916 | Dearborn |
| 2,912,632 A | 11/1959 | Turtil |
| 3,514,952 A | 6/1970 | Schumacher et al. |
| 3,515,361 A | 6/1970 | Blackburn |
| 3,618,880 A | 11/1971 | Hagaman, et al. |
| 3,621,763 A | 11/1971 | Geyer |
| 3,714,535 A | 1/1973 | Krivak et al. |
| 3,795,853 A | 3/1974 | Whitehouse |
| 3,815,357 A | 6/1974 | Brennan |
| 3,932,058 A | 1/1976 | Harner et al. |
| 3,936,226 A | 2/1976 | Harner et al. |
| 4,005,822 A | 2/1977 | Timms |
| 4,137,711 A | 2/1979 | Montgomery |
| 4,184,107 A | 1/1980 | Turini et al. |
| 4,191,094 A | 3/1980 | Flippo |
| 4,284,930 A | 8/1981 | Matty |
| 4,297,844 A | 11/1981 | Halin et al. |
| 4,383,647 A | 5/1983 | Woodruff et al. |
| 4,424,669 A | 1/1984 | Fage |
| 4,437,783 A | 3/1984 | Halin et al. |
| 4,442,928 A | 4/1984 | Eastman |
| 4,458,863 A | 7/1984 | Smith |
| 4,459,121 A | 7/1984 | Gazzera et al. |
| 4,462,207 A | 7/1984 | Hitchcock |
| 4,519,561 A | 5/1985 | Timms |
| 4,543,783 A | 10/1985 | Greiine et al. |
| 4,546,783 A | 10/1985 | Lott |
| 4,585,189 A | 4/1986 | Buxton |
| 4,586,329 A | 5/1986 | Carlin |
| 4,607,202 A | 8/1986 | Koenig |
| 4,651,621 A | 3/1987 | Eastman |
| 4,656,407 A | 4/1987 | Burney |
| 4,788,531 A | 11/1988 | Corwin et al. |
| 4,827,248 A | 5/1989 | Crudden et al. |
| 5,167,119 A | 12/1992 | Ward |
| 5,213,286 A | 5/1993 | Elliott, deceased et al. |
| 5,243,817 A | 9/1993 | Matthias |
| 5,267,436 A | 12/1993 | Wood, Jr. et al. |
| 5,282,719 A | 2/1994 | McCarty et al. |
| 5,313,788 A | 5/1994 | Wright et al. |

(List continued on next page.)

FOREIGN PATENT DOCUMENTS

EP    1 004 798    5/2000

*Primary Examiner*—Ehud Gartenberg
(74) *Attorney, Agent, or Firm*—Robert Desmond, Esq.

(57) ABSTRACT

An improved jet engine thrust reverser that includes a sensor to determined the rotational position of a motor. The system includes an actuator, a motor, motor position sensor, and an electronic control unit. The electronic control unit converts the rotational position of the motor to thrust reverser system using, for example, a summation algorithm and reset logic. The summation algorithm incrementally calculates absolute position of the thrust reverser from the sensed motor rotational position.

33 Claims, 15 Drawing Sheets

U.S. PATENT DOCUMENTS

| | | |
|---|---|---|
| 5,327,055 A | 7/1994 | Danielson et al. |
| 5,381,654 A | 1/1995 | Halin |
| 5,448,884 A | 9/1995 | Repp |
| 5,524,431 A | 6/1996 | Brusson et al. |
| 5,615,549 A | 4/1997 | Valleroy |
| 5,813,218 A | 9/1998 | Kohlbacher |
| 5,826,823 A | 10/1998 | Lymons et al. |
| 5,904,041 A | 5/1999 | Dhainault |
| 5,960,626 A | 10/1999 | Baudu et al. |
| 5,996,937 A | 12/1999 | Gonidec et al. |
| 6,009,356 A | 12/1999 | Monroe |
| 6,021,636 A | 2/2000 | Johnson et al. |
| 6,034,492 A | 3/2000 | Saito et al. |
| 6,042,053 A | 3/2000 | Sternberger et al. |
| 6,044,641 A | 4/2000 | Baudu et al. |
| 6,094,908 A | 8/2000 | Baudu et al. |
| 6,121,740 A | 9/2000 | Gale et al. |
| 6,167,694 B1 | 1/2001 | Davies |
| 6,178,867 B1 | 1/2001 | Kovac |
| 6,211,665 B1 | 4/2001 | Ahrendt et al. |
| 6,240,246 B1 | 5/2001 | Evans |
| 6,307,339 B1 | 10/2001 | Yourist et al. |
| 6,519,929 B2 * | 2/2003 | Ahrendt .................... 60/226.2 |

* cited by examiner

THRUST REVERSER POSITION DETERMINATION SYSTEM AND METHOD

CROSS-REFERENCE TO RELATED APPLICATION

This application claims the benefit of U.S. Provisional Application No. 60/307,527, filed Jul. 24, 2001.

BACKGROUND OF THE INVENTION

The present invention relates to jet engine thrust reversers and, more particularly, to a thrust reverser actuation system with the ability to determine the position of system components from the rotational position of a motor within the system.

When a jet-powered aircraft lands, the landing gear brakes and imposed aerodynamic drag loads (e.g., flaps, spoilers, etc.) of the aircraft may not be sufficient to slow the aircraft down in the required amount of runway distance. Thus, jet engines on most aircraft include thrust reversers to enhance the braking of the aircraft. When deployed a thrust reverser redirects the rearward thrust of the jet engine to a forward or semi-forward direction to decelerate the aircraft upon landing. When in the stowed position, the thrust reverser is in a position that generally does not redirect the engine thrust.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes positioned on the outside of the engine. The moveable thrust reverser component in the cascade may includes several translating sleeves or cowls ("transcowls") that are deployed to expose the cascade vanes. Target-type reversers, also referred to as clamshell reversers, are typically used with low-bypass ratio jet engines. Target-type thrust reversers use two doors as the moveable thrust reverser component to block the entire jet thrust coming from the rear of the engine. These doors are mounted on the aft portion of the engine and form the rear part of the engine nacelle. Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking power of the aircraft, thereby shortening the stopping distance during landing. Hence, thrust reversers are usually deployed during the landing process to slow the aircraft. The moveable thrust reverser components in each of the above-described designs are moved between the stowed and deployed position by means of actuators. Power to drive the actuators may come from one or more drive motors or from a hydraulic or pneumatic fluid system connected to the actuators, depending on the system design requirements.

One way of monitoring and determining the position of a thrust reverser is to use one or more position sensors mounted on a gearhead reducer. However, the degree of accuracy attained by such sensors may not be sufficiently precise for some applications. In particular, the degree of inaccuracy of these position sensors may be great enough that a position sensor could indicate that the thrust reverser is stowed when it is not.

When highly accurate thrust reverser position information is desired, employing higher accuracy position sensors may add both excess weight and cost to the thrust reverser system. Additionally, under some system architectures, position sensors provide the sole source of position information for the thrust reverser components. Thus, a secondary source of position information is lacking to backup the primary indicator. However, it should be appreciated that current thrust reverser systems are generally reliable and safe.

In view of the foregoing, there is a need for a thrust reverser system that accurately determines the position of the system's moveable components to solve one or more of the drawbacks identified above, including the accurate determination of the absolute position of a thrust reverser component, and/or the avoidance of the weight and cost associated with current position sensors, and/or that has a back-up determination of thrust reverser component position without adding additional components and/or weight to the existing system. The present invention satisfies one or more of these needs.

SUMMARY OF THE INVENTION

The present invention provides an improved thrust reverser system and method that determines thrust reverser position based on the rotational position of the motor used to drive the thrust reverser actuators.

In one embodiment of the present invention, and by way of example only, a system for determining the position of a jet engine thrust reverser component includes a motor, at least one actuator, a first rotational position sensor, and a circuit. The actuator is coupled to the motor and is operable to move the thrust reverser component in response to rotation of the motor. The first rotational position sensor is operable to sense a rotational position of the motor and supply a first rotational position signal representative thereof. The circuit is coupled to receive at least the first rotational position signal and is operable to determine thrust reverser component position based at least in part on the first rotational position signal.

In another exemplary embodiment, a jet engine thrust reverser control system includes an electric motor, at least one actuator, a first rotational position sensor, and a circuit. The actuator is coupled to the electric motor and is operable to move a thrust reverser in response to rotation of the motor. The first rotational position sensor is operable to sense a rotational position of the electric motor and supply a first rotational position signal representative thereof. The circuit is coupled to receive at least the first rotational position signal and is operable to determine thrust reverser position based at least in part on the first rotational position signal.

In yet another exemplary embodiment, in a thrust reverser control system having a motor operably coupled to move a thrust reverser component between a stowed position and a deployed position, a method of determining jet engine thrust reverser component position includes rotating the motor, counting revolutions of the motor, and converting the counted motor revolutions into thrust reverser component position.

In still a further exemplary embodiment, in a thrust reverser control system having a motor operably coupled to move a thrust reverser component between a stowed position and a deployed position, and that implements an algorithm to determine thrust reverser component position from a position of the motor, a method of declaring the algorithm valid includes rotating the motor to move the thrust reverser component toward the stowed position, determining that the thrust reverser component is stowed, and declaring the algorithm valid when thrust reverser component stowage is determined.

Other independent features and advantages of the preferred system and method will become apparent from the following detailed description, taken in conjunction with the accompanying drawings which illustrate, by way of example, the principles of the invention.

DETAILED DESCRIPTION OF THE INVENTION

Before proceeding with the detailed description of the invention, it is to be appreciated that the present invention is not limited to use in conjunction with a specific thrust reverser system design. Although the present invention is explicitly described as being implemented in a cascade-type thrust reverser system, in which transcowls are used as the moveable thrust reverser component, it will be appreciated that it can be implemented in other thrust reverser system designs.

Figure 1:
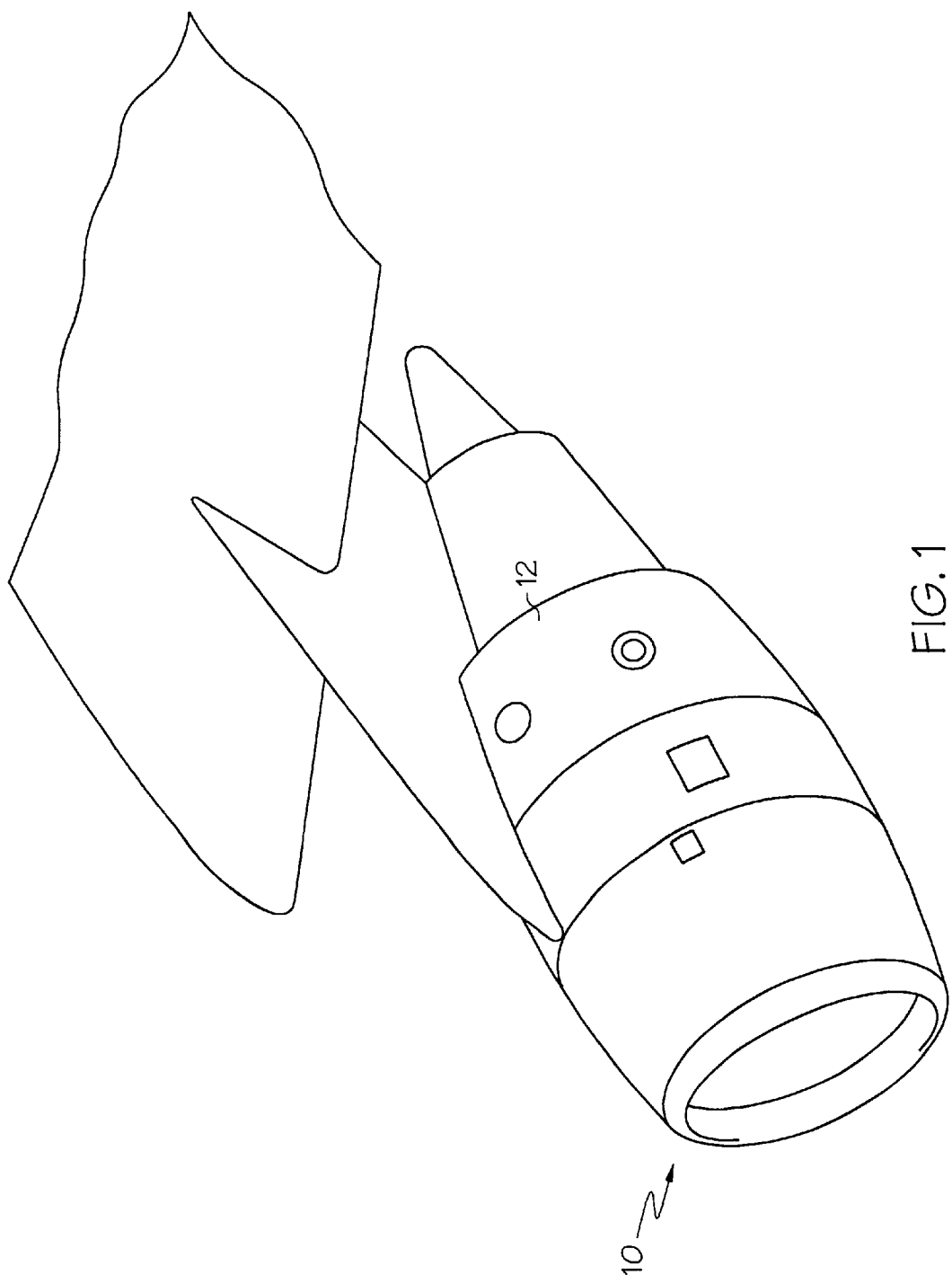
FIG. 1 is a perspective view of an aircraft engine.

Turning now to the description, and with reference first to FIG. 1, a perspective view of portions of an aircraft jet engine fan case 10 that incorporates a cascade-type thrust reverser is depicted. The jet engine fan case 10 includes a pair of semi-circular transcowls 12 that are positioned circumferentially on the outside of the jet engine fan case 10.

Figure 2:
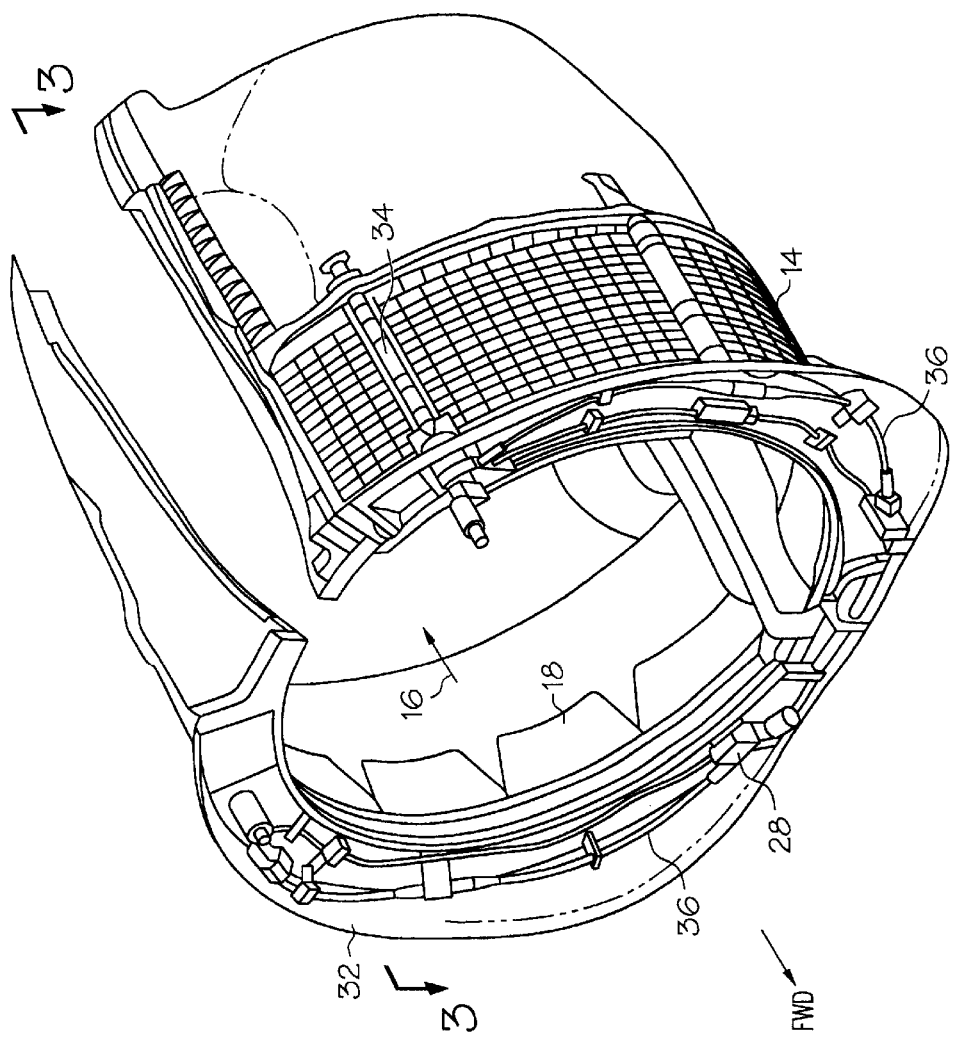
FIG. 2 is a perspective view of portions of an engine fan cowl and thrust reverser system utilized with the engine of FIG. 1.
Figure 3:
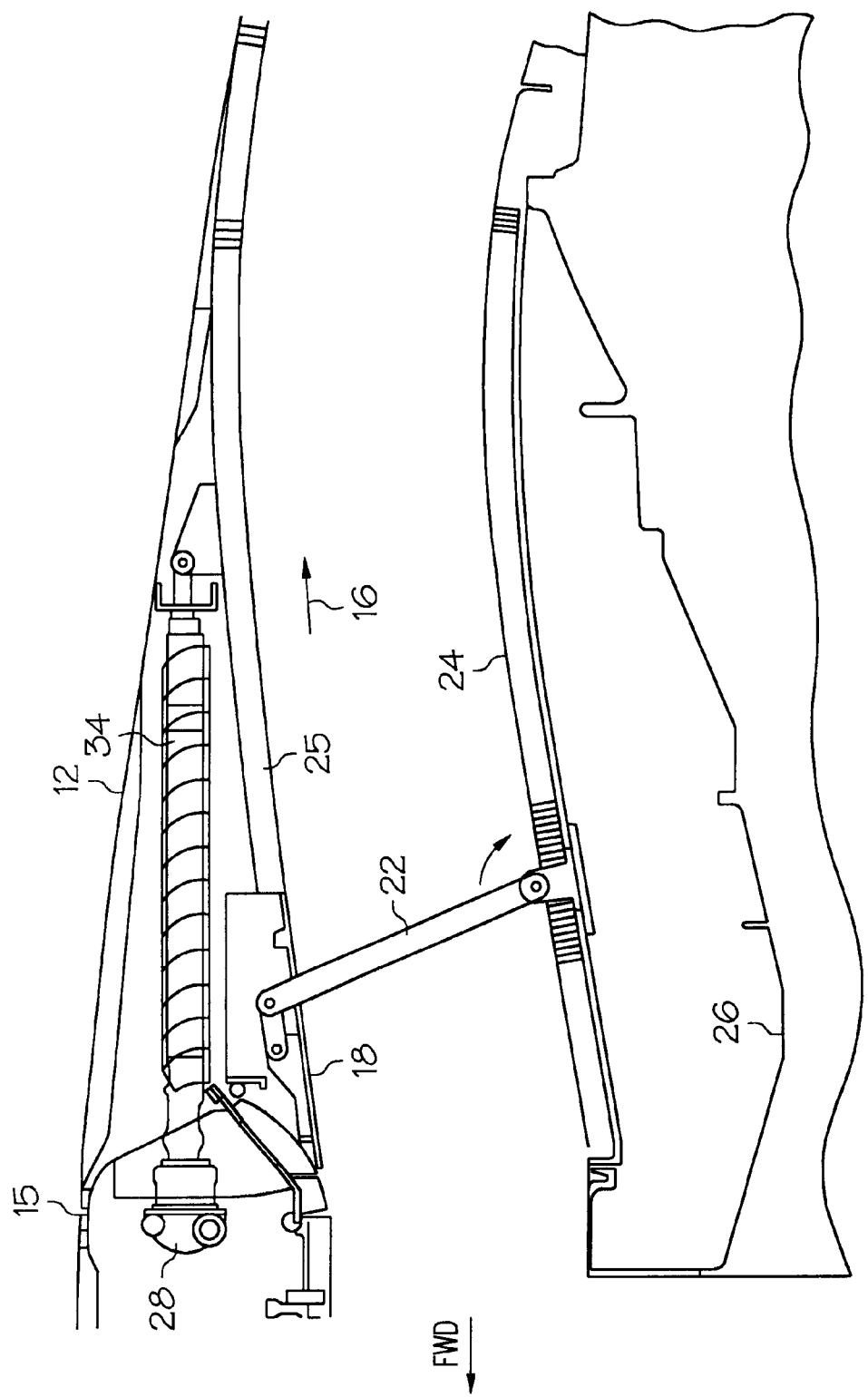
FIG. 3 is a partial cross section view taken along line 3—3 of FIG. 2.

As shown more particularly in FIGS. 2 and 3, the transcowls 12 cover a plurality of cascade vanes 14, which are positioned between the transcowls 12 and a bypass air flow path 16. When in the stowed position, as depicted in FIG. 3, the transcowls 12 are pressed against one or more stow seals 15, which keep air in the bypass air flow path 16 when the thrust reversers are in the stowed position. A series of blocker doors 18 are mechanically linked to the transcowls 12 via a drag link 22 that is rotatably connected to an inner wall 24 that surrounds the engine core 26. In the stowed position, the blocker doors 18 form a portion of an outer wall 25 and are therefore oriented parallel to the bypass air flow path 16. When the thrust reversers are commanded to deploy, the transcowls 12 are translated aft, causing the blocker doors 18 to rotate into a deployed position, such that the bypass air flow path 16 is blocked. This also causes the cascade vanes 14 to be exposed and the bypass air flow to be redirected out the cascade vanes 14. The redirection of the bypass air flow in a forward direction creates a reverse thrust and, thus, works to slow the airplane.

One or more actuators 28 per engine are used to operate the transcowls 12. The actuators 28 are mounted to a stationary forward frame 32 and each includes an actuator element 34, such as a ball screw, that is connected to the transcowls 12. The actuators 28 interconnect with each other via a synchronization mechanism, such as a plurality of flexible shafts 36. The flexible shafts 36 ensure that the actuators 28 move at substantially the same rate. Thus, when the actuators 28 rotate, the actuator elements 34 and the connected transcowls 12 are caused to translate at substantially the same rate.

Figure 4:
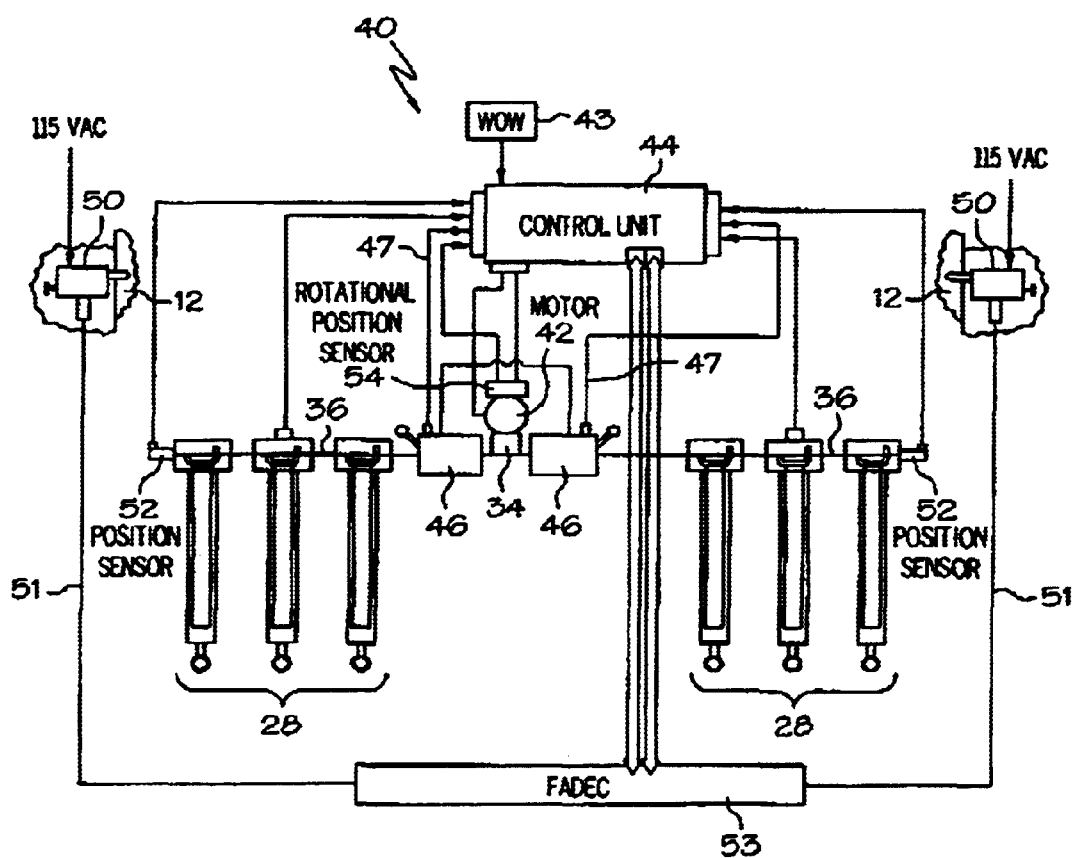
FIG. 4 is a simplified functional schematic representation of an exemplary thrust reverser control system according to an embodiment of the present invention.

An actuation control system controls movement of the transcowls 12 from a locked and stowed position to an unlocked and deployed position for producing reverse thrust, and returns the transcowls 12 from the deployed position back to the stowed and locked position. A simplified functional schematic representation of an exemplary thrust reverser actuation control system is depicted in FIG. 4. The actuation control system 40 includes a plurality of actuators 28, each connected to a transcowl 12 (not illustrated in FIG. 4), and interconnected by one or more flexible shafts 36. Each of the actuators 28 is driven by an electric or pneumatic motor 42, that is controlled by a multi-channel control unit 44. The control unit 44 receives command signals from a main engine controller 53, such as, for example, a Fully-Automated Digital Electronic Controller (FADEC) or a controller located in the aircraft, that cause the actuation control system 40 to operate. The control unit 44, as will be discussed further below, additionally provides various signals to the main engine controller 53.

The actuation control system 40 may additionally include a torque decoupler 34. It should be appreciated that the actuation control system 40 may be configured to include more than one motor 42. Indeed, the skilled artisan will appreciate that the actuation control system 40 could include two motors 42, one for each transcowl 12. The use of a single motor 42 is merely exemplary of a preferred embodiment. Moreover, the use of a single, multi-channel control unit 44 is also exemplary of a preferred embodiment, and the skilled artisan will appreciate that multiple, single channel controller units 44 may also be used.

The actuation control system 40 further includes a plurality of locking mechanisms, including at least primary locks 46, and tertiary locks 50. Each of these locks is provided to prevent unintended movement of the transcowls 12 from the stowed position. The primary locks 46 are coupled to the thrust reverser drive train. In other words, these locks are coupled to the components (e.g., the motor 42, the actuators 28, etc.) that drive the transcowls 12 between the stowed and deployed position. Conversely, the tertiary locks 50 are coupled one each to the transcowls 12, and are used to lock the transcowls 12 in the stowed position. The primary 46 and tertiary 50 locks are generally electrically operated, though these locks could optionally be manually operated. No matter the particular mode of operation, each includes a position sensor that provides a lock position signal representative of whether it is in its locked or unlocked position. In the depicted embodiment, a primary lock position signal 47 is supplied to the control unit 44, and a tertiary lock position signal 51 is supplied to the main engine controller 53. These lock position sensors may be any one of numerous position sensors known in the art including, but not limited to, limit switches, eddy current sensors, Hall effect type sensors, and optical sensors.

A position sensor 52 is additionally coupled to one or more of the actuators 28 that are connected to each of the transcowls 12. In the depicted embodiment, each of the position sensors 52 is coupled to gearing within the actuators 28 and is operable to provide a position signal representative of the position of the transcowl 12 to which the particular actuator 28 is coupled. The position signals from each of the position sensors 52 are supplied to the control unit 44. In the context of the present invention, the position sensors 52, as will be described more fully below, provide secondary, or back-up, thrust reverser position indication to the control unit 44. It will be appreciated that the position sensors 52 may be any one of numerous position sensors known in the art including, but not limited to, an eddy current sensor, a Hall effect type sensor, an optical sensor, and an RVDT. In a preferred embodiment, however, the position sensors 52 are resolver units.

In the depicted embodiment, a rotational position sensor 54 is coupled to the motor 42. The rotational position sensor 54 detects the rotational position of the motor 42 by sensing the rotation of a rotating component within the motor 42 such as, for example, the motor's shaft, and supplies a rotational position signal representative of the motor's rotation. The control unit 44 is electrically coupled to receive the rotational position signal from the rotational position sensor 54. As will be discussed in more detail below, the control unit 44 evaluates the rotational position signal supplied by the rotational position sensor 54 to determine the position of the transcowls 12. The rotational position sensor 54 may be any one of numerous position sensors known in the art including, but not limited to, a Hall effect type sensor, and an optical sensor. In a preferred embodiment, however, the rotational position sensor 54 is a resolver unit. It will additionally be appreciated that in an alternate embodiment, the rotational position sensor 54 is not used. Instead, a separate software algorithm evaluates various voltage and/or current signals supplied to the motor 42, and/or fedback from the motor 42, to determine the rotational position of the motor 42.

Generally, the thrust reverser control system 40 is commanded to operate by, for example, receiving a command (either a deploy command or a stow command) from the main engine controller 53. For example, upon receiving a deploy command, the control unit 44 commands the primary locks 46 to unlock, while the tertiary locks 50 are commanded to unlock from airplane. At substantially the same time, the motor 42 is momentarily caused to first rotate in the stow direction and then in the deploy direction. This momentary rotation in the stow direction, referred to as an "overstow" or "countertorque" assists in releasing one or more of the locks (depending on the particular type used) and, as will be discussed in more detail below, can also assist in resetting the algorithm that is used to determine thrust reverser position from motor rotational position (referred to hereafter as the "motor summed position algorithm"). Following the overstow command, the control unit 44 commands the motor 42 to rotate in the deploy direction. As a result, the actuators 28 move the transcowls 12 to the deployed position. Once the transcowls 12 reach the fully deployed position, the control unit 44 commands the motor 42 to stop rotating. When the thrust reversers are no longer needed, the control unit 44, in response to a stow command from the main engine controller 53, commands the motor 42 to rotate in the stow direction. As a result, the actuators 28 move the transcowls 12 to the stowed position. Once the transcowls 12 reach the fully stowed position, the control unit 44 commands the motor 42 to stop rotating, and commands the primary locking mechanisms 46 to lock.

Throughout the deploy and stow operations, the position of the thrust reversers is preferably determined from the rotational direction and rotational position of the motor 42 using the motor summed position algorithm, though in some instances thrust reverser position may be determined from the position sensors 52. The circumstances under which thrust reverser position is determined from the motor summed position algorithm or from the position sensors 52, and the method by which thrust reverser position is determined from motor rotational position will now be described in more detail.

Figure 5:
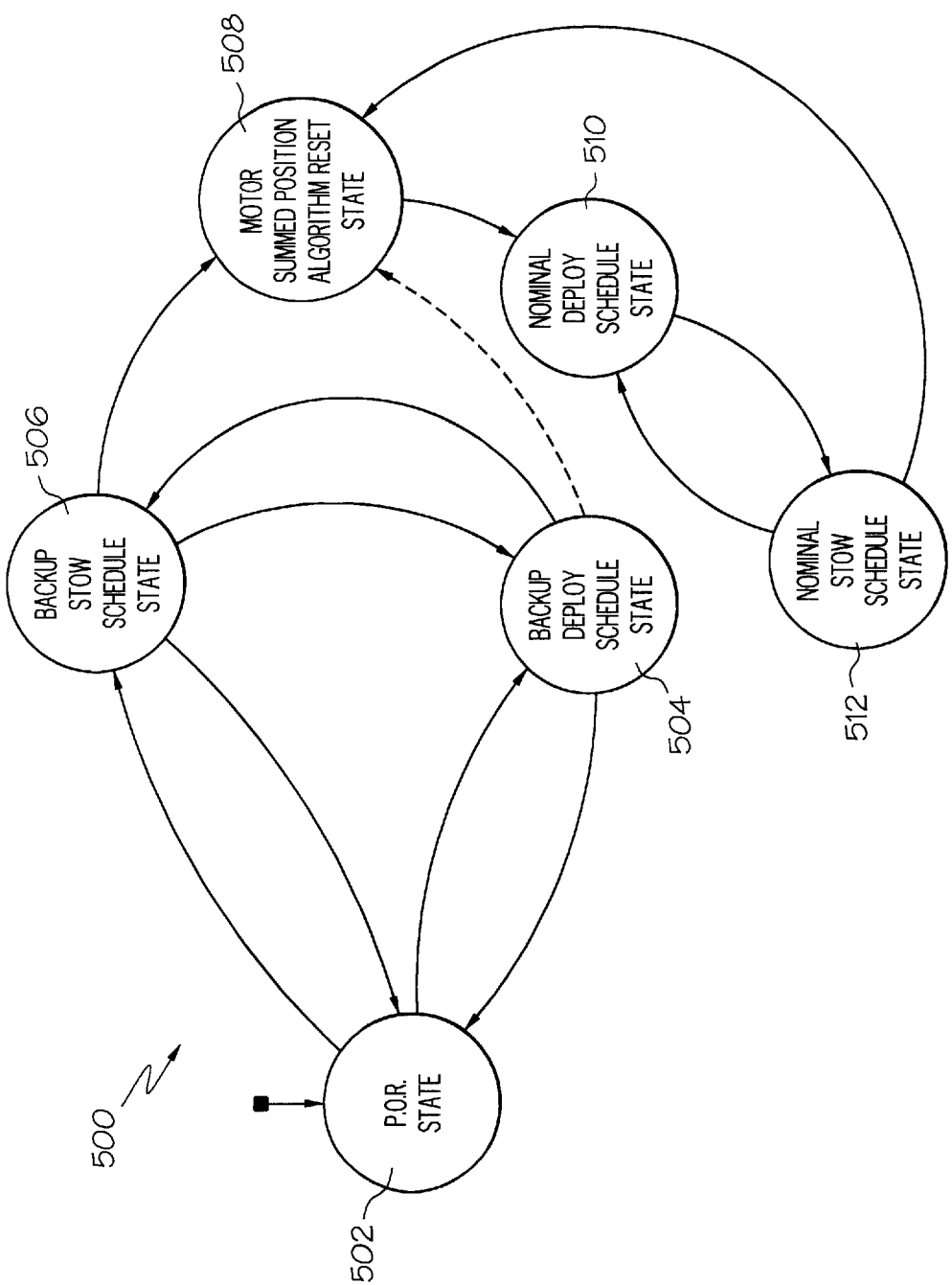
FIG. 5 is a state diagram depicting the various operational states in which the control system of FIG. 4 may operate.

Referring first to FIG. 5, which depicts a state diagram of the overall thrust reverser control and position monitoring algorithm, a description of the circumstances under which thrust reverser position is determined from motor position or from the position sensors 52, and the overall operation of the thrust reverser control system 40 will now be discussed. As FIG. 5 depicts, the thrust reverser control system 40 has at least six different general operational states. The first operational state 502, referred to as the "Power-On Reset" (POR) state, occurs when the thrust reverser control system 40 is initially energized or experiences an intermittent loss of power. In the POR state 502, the motor summed position algorithm is not considered valid. Thus, valid thrust reverser position is available only from the position sensors 52. Because the accuracy of the position sensors 52 is less than that obtained from the motor summed position algorithm, the thrust reverser actuation control system 40 moves the thrust reversers at relatively lower rates of speed than that which is used when thrust reverser position is determined from motor position.

In particular, when the control unit 44 receives a deploy command or a stow command while the actuation control system 40 is in the POR state 502, the actuation control system 40 transitions to a backup deploy schedule state 504 or a backup stow schedule state 506, respectively. In the backup deploy schedule state 504, the control unit 44 causes the motor 42 to rotate in the deploy direction according to a backup deploy speed schedule, which is a lower rate of speed compared to the nominal deploy speed schedule that is used when thrust reverser position is determined from the motor summed position algorithm. Before rotating the motor 42 in the deploy direction, however, the actuation control system 40, in response to the deploy command, first rotates the motor 42 in the stow direction for a predetermined time period. As was noted above, this rotation in the stow direction for the predetermined time period provides the above-referenced overstow which, as was also noted above, assists in releasing one or more of the locks. When the overstow is complete, the control unit 44 causes the motor 42 to rotate in the deploy direction according to the backup deploy speed schedule until the thrust reversers are deployed.

Similarly, if the control unit 44 receives a stow command while the actuation control system 40 is in the POR state 502, the actuation control system 40 transitions to the backup stow schedule state 506. Once in the backup stow schedule state 506, the actuation control system 40 either transitions to a motor summed position algorithm reset state 508 or remains in the backup stow schedule state 506. The actuation control system 40 remains in the backup stow schedule state 506 if the conditions needed to reset the motor summed position algorithm are not met. In this instance, the control unit 44 causes the motor 42 to rotate in the stow direction according to the backup stow speed schedule until the thrust reversers are stowed. The conditions needed to reset the motor summed position algorithm are discussed in more detail further below.

Once the conditions needed to reset the motor summed position algorithm are met and the motor summed position algorithm is reset to zero and is declared valid, the thrust reverser control system 40 transitions to the motor summed position algorithm reset state 508. In this state, when the control unit 44 receives a stow or deploy command, the control unit 44 causes the motor 42 to rotate at a higher speed as compared to the backup speed schedules. This is because determining thrust reverser position from the motor summed position algorithm is more accurate than determining thrust reverser position from the sensors 52.

The general operation of actuation control system 40 while in the motor summed position algorithm reset state 508 is similar to its operation when in the POR state 502, but at higher rates of motor rotation. Specifically, when the control unit 44 receives a deploy command while the actuation control system 40 is in the motor summed position algorithm reset state 508, the actuation control system 40 transitions to a nominal deploy schedule state 510. In the nominal deploy schedule state 510 the control unit 44 causes the motor 42 to rotate in the deploy direction according to the nominal deploy speed schedule. Again, before rotating the motor 42 in the deploy direction, the actuation control system 40 rotates the motor 42 in the stow direction for a predetermined time period to perform the overstow. When the overstow is complete, the control unit 44 causes the motor 42 to rotate in the deploy direction according to the nominal deploy speed schedule until the thrust reversers are deployed. The actuation control system 40 will remain in the nominal deploy schedule state 510 until the control unit 44 receives a stow command or a power interruption occurs.

When the control unit 44 receives a stow command, the actuation control system 40 transitions to the nominal stow schedule state 512, in which the control unit 44 causes the motor 42 to rotate in the stow direction according to the nominal stow speed schedule until the thrust reversers are stowed. The actuation control system 40 will remain in the nominal stow schedule state 512 until the controller circuit receives another deploy command or a power interruption occurs. At this point, the previously described transitions will again take place.

It should be noted that in the embodiment depicted in FIG. 5, the actuation control system 40 transitions to the motor summed position algorithm reset state 508 only from the backup stow schedule state 506. That is, the motor summed position algorithm reset state 508 can only be transitioned into if a stow command is initiated following a transition to the POR state 502, and the other conditions for resetting the motor summed position algorithm, which is described in more detail below, are met. In an alternative embodiment, however, the actuation control system 40 can transition to the motor summed position algorithm reset state 508 from either the backup stow schedule state 506 or the backup deploy schedule state 504. In this alternative embodiment, which is depicted using the phantom transition line in FIG. 5, the overstow rotation that occurs as part of a deploy command may be used as part of the motor summed position reset algorithm.

In a preferred embodiment, the thrust reverser actuation control system 40 uses a collection of various software algorithms to determine thrust reverser position from motor position, as well as to confirm thrust reverser stowage without using a separate stow sensor. Each of these algorithms will now be discussed, beginning first with the motor summed position algorithm. In doing so, it is to be appreciated that the parenthetical references to STEPs corresond to the particular reference numerals of the algorithms' flows depicted in the subsequent figures.

Figure 6:
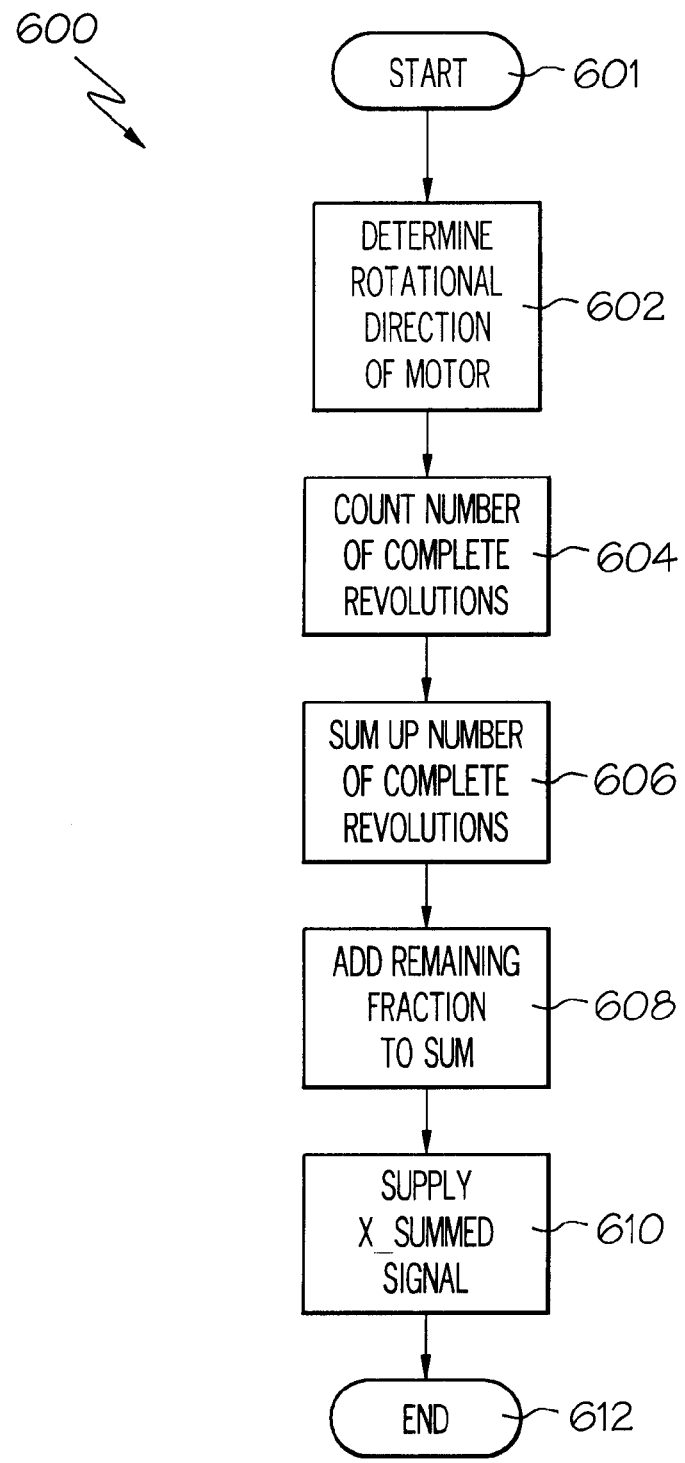
FIG. 6 is a flowchart depicting a method for determining thrust reverser position from actuator motor rotations according to an exemplary embodiment of the present invention.

As previously noted, the motor summed position algorithm, once it is reset and declared valid, provides very accurate thrust reverser position indication by counting motor revolutions. Specifically, the signal from the motor resolver 54, or from a separate software algorithm in a sensorless control architecture, is evaluated by the algorithm to determine both the direction of rotation and the number of revolutions. In particular, and with reference to FIG. 6, the motor summed position algorithm 600 evaluates this signal (THETA_MOTOR) and, based on its evaluation, determines the direction of rotation (STEP 602), counts the number of complete revolutions of the motor 42 in the determined direction (STEP 604), and sums up the motor revolutions to within one complete motor revolution (STEP 606). The remaining resolver signal is then added to this sum to provide the precise number of motor revolutions (STEP 608). This final summation result is then translated into an absolute thrust reverser position indication signal (X_SUMMED) (STEP 610). It should be appreciated that the present invention is not limited to these steps. For example, the motor summed position algorithm 600 could be implemented using only the nearest integer motor revolution count (e.g., only STEPS 602–606), and still provide sufficiently high accuracy position indication.

Figure 7:
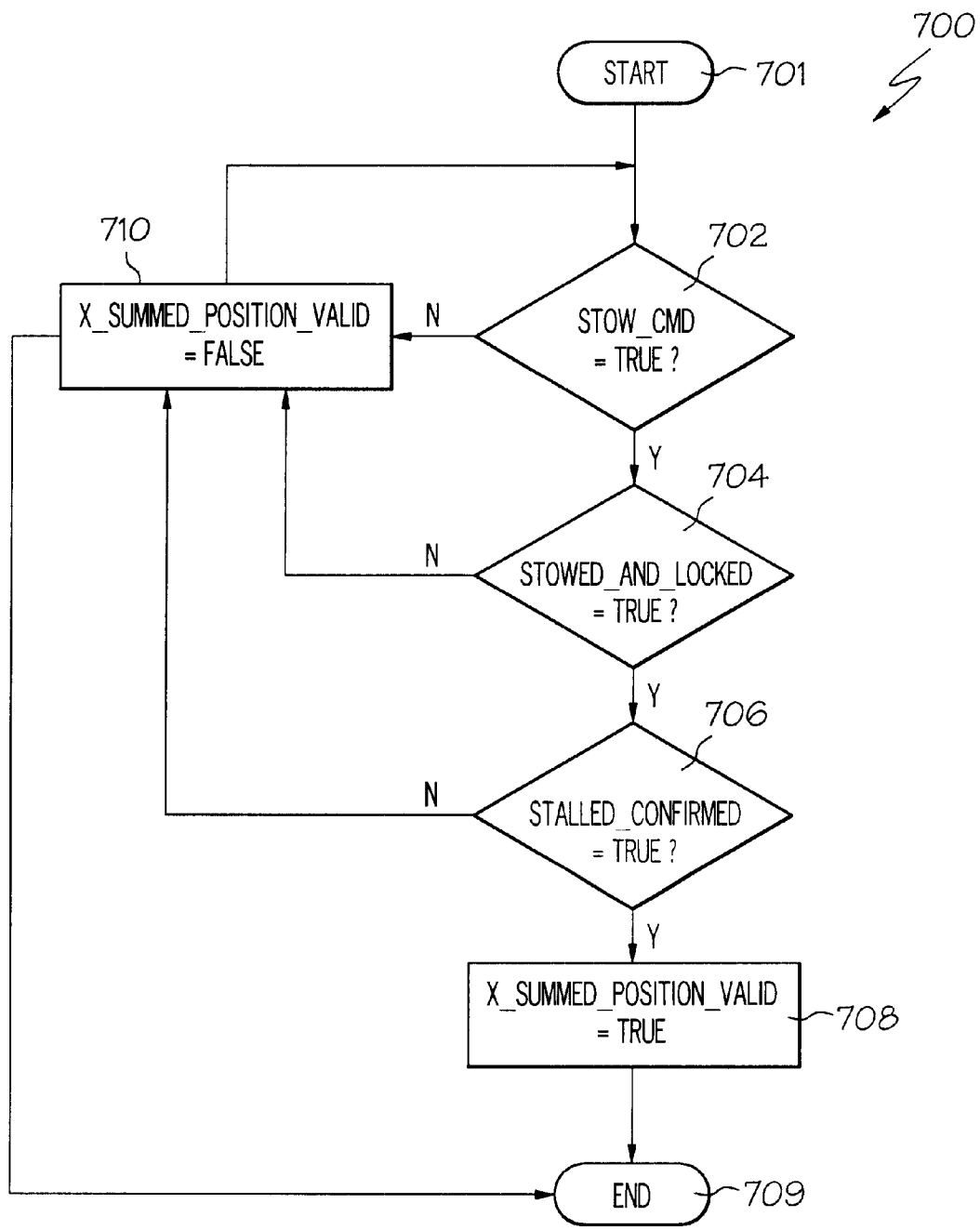
FIG. 7 is a flowchart depicting an exemplary method for zeroing the position algorithm used in the method depicted in FIG. 6.

Another major software algorithm that is used is a motor summed position reset algorithm, which is depicted in flowchart form in FIG. 7. The reset algorithm 700 is used to reset the motor summed position algorithm to zero and declare the motor summed position signal valid, which allows the control system to transition to the motor summed position algorithm reset state 508. As FIG. 7 illustrates, the motor summed position reset algorithm 700 resets the motor summed position algorithm to zero preferably when at least three conditions are true. The first condition is that a thrust reverser stow command (STOW_CMD) is issued by the main engine controller 53 to the control unit 44 (STEP 702), the second condition is that the thrust reversers are confirmed to be in the stowed position and locked (STOWED_AND_LOCKED) (STEP 704), and the third condition is that the motor 42 is confirmed to be stalled (STALLED_CONFIRMED) (STEP 706). Preferably, the motor summed position algorithm is reset (and declared valid)

(X_SUMMED_POSITION_VALID) when all of these conditions are met (STEP 708). It will be appreciated, with quick reference back to FIG. 5, that the stow command is preferably initiated from the backup stow schedule state 504 or the nominal stow schedule state 512. Alternatively, as was noted above, the stow command (STEP 702) that is issued as part of the motor summed position reset algorithm 700, may also be the above-mentioned overstow that takes place in response to a deploy command. In a preferred embodiment, separate software algorithms are used to confirm that the thrust reversers are in the stowed and locked position (STEP 704) and that the motor is stalled (STEP 706). These additional algorithms, depicted in FIGS. 8 and 9, respectively, will now be described.

Figure 8:
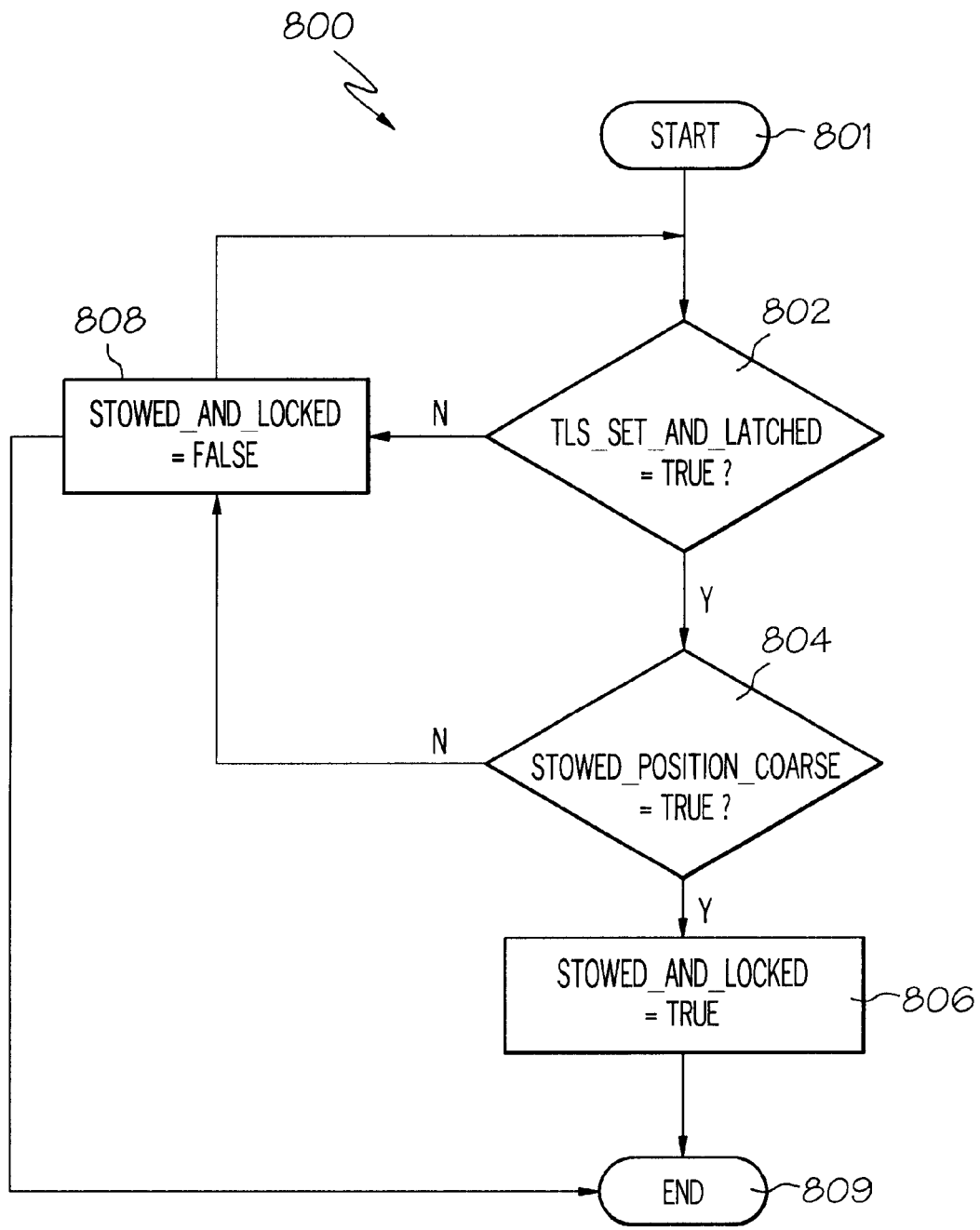
FIG. 8 is a flowchart depicting an exemplary method for declaring thrust reversers stowed and locked.

Referring first to FIG. 8, it can be seen that the software algorithm 800 used to declare STOWED_AND_LOCKED true preferably occurs when two conditions are true. The first condition is that the tertiary locks 50 are set and latched (TLS_SET_AND_LATCHED) (STEP 802). The second condition is that the position sensors 52, which provide a coarse position indication signal as compared to the motor summed position algorithm, indicate that the thrust reversers are in the stowed position (STOWED_POSITION_COARSE) (STEP 804). It will be appreciated that in another embodiment the thrust reversers may be declared stowed and locked when only the first condition, TLS_SET_AND_LATCHED, is true.

Figure 9:
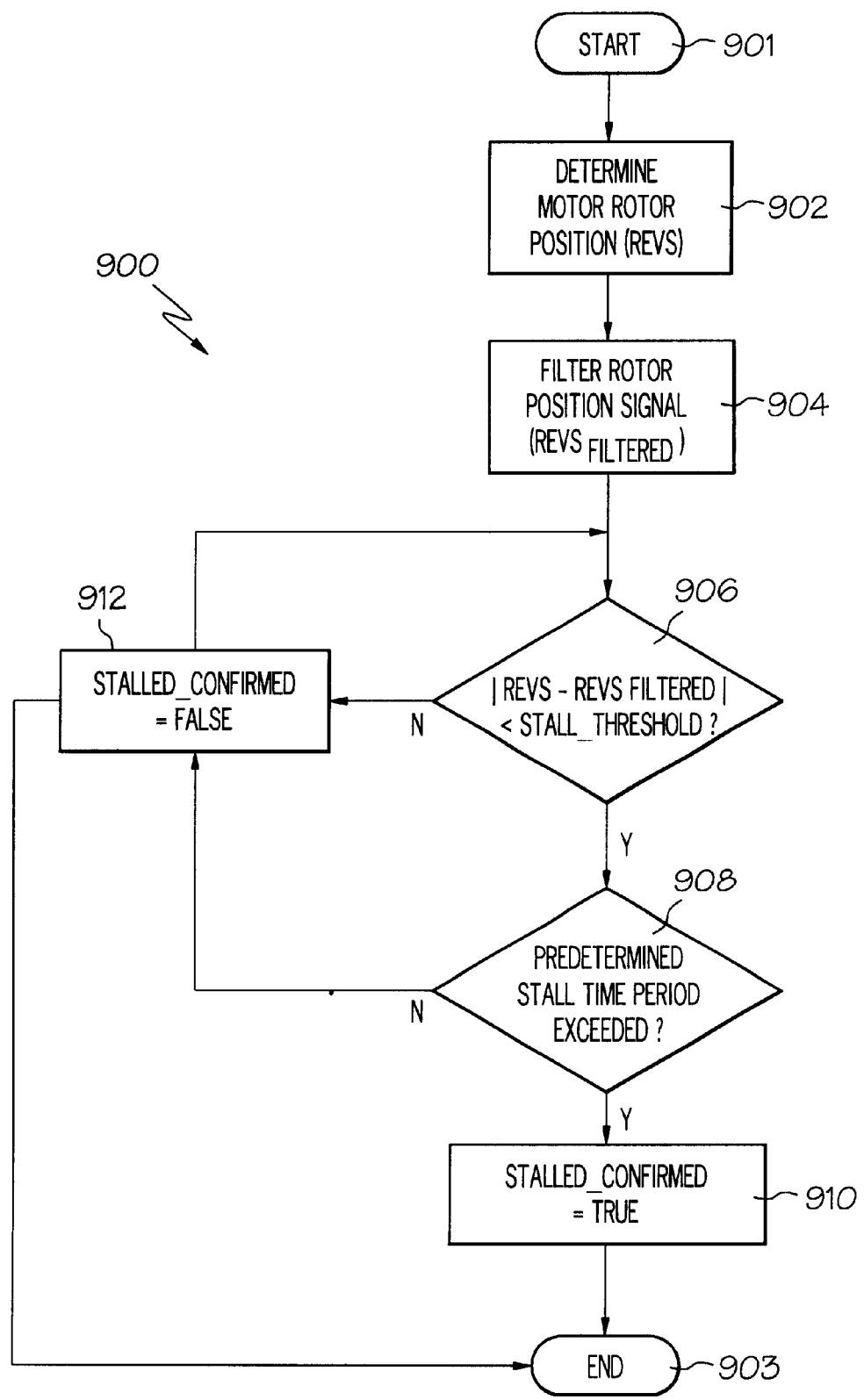
FIG. 9 is a flowchart depicting an exemplary method for confirming that a thrust reverser motor is stalled.

Turning now to FIG. 9, the motor stall confirmation algorithm 900 preferably uses a motor rotor position signal and a low-pass filtered motor rotor position signal to confirm that the motor is stalled. Specifically, the controller determines rotor position from the motor rotor position signal (STEP 902) and also filters this signal using a low-pass filter (STEP 904). Then, the position signal and the filtered position signal are compared and if the difference between the signals is less than a predetermined threshold (e.g., STALL_THRESHOLD) (STEP 908), and is determined to be so for a predetermined period of time (STEP 910), the motor is confirmed to be stalled (STEP 912).

Figure 10:
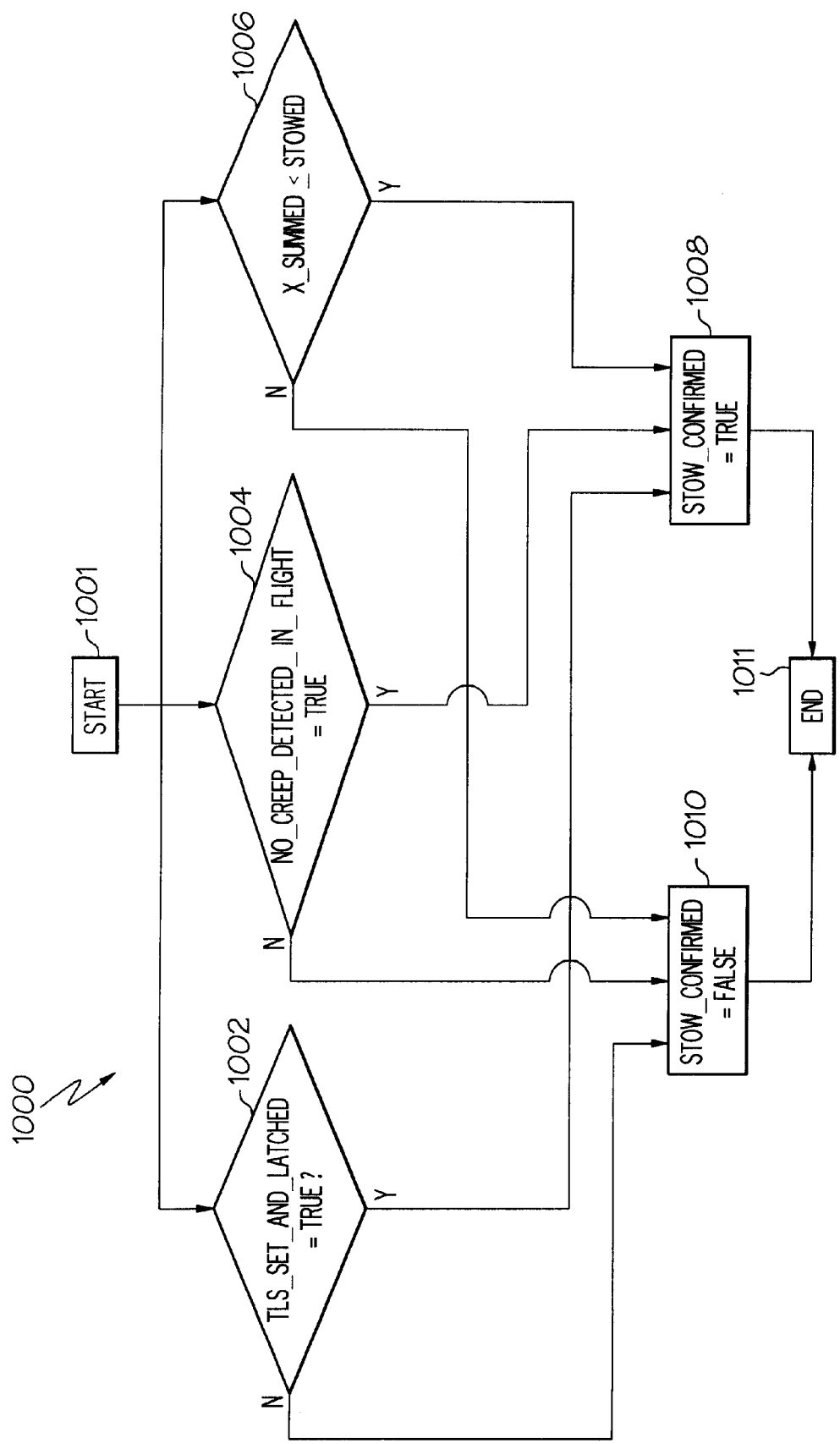
FIG. 10 is a flowchart depicting an exemplary method for confirming whether or not a thrust reverser is in its stowed position.

Two additional major software algorithms that are used in the preferred embodiment include a stow confirmation algorithm and a creep detection algorithm. The stow confirmation algorithm is depicted in FIG. 10 and, as its name implies, is used to declare that the thrust reversers are stowed. According to this algorithm 1000, the thrust reversers are declared stowed (STOW_CONFIRMED) if any one of at least three conditions is true. The first condition is that TLS_SET_AND_LATCHED is true (STEP 1002), the second condition is that the creep detection algorithm (discussed further below) detects no creep in flight (NO_CREEP_DETECTED_IN_FLIGHT) (STEP 1004), and the third condition is that thrust reverser position, as determined by the motor summed position algorithm 600 (X_SUMMED), indicates that the thrust reversers are stowed (STEP 1006). As FIG. 10 further illustrates, the second condition is true when the motor summed position algorithm 600 determines that the thrust reverser position is within a predetermined threshold distance of the zero position (STOWED). In a particular preferred embodiment, this threshold distance is 6 millimeters (mm), which ensures the transcowls 12 are on their seals.

Figure 11:
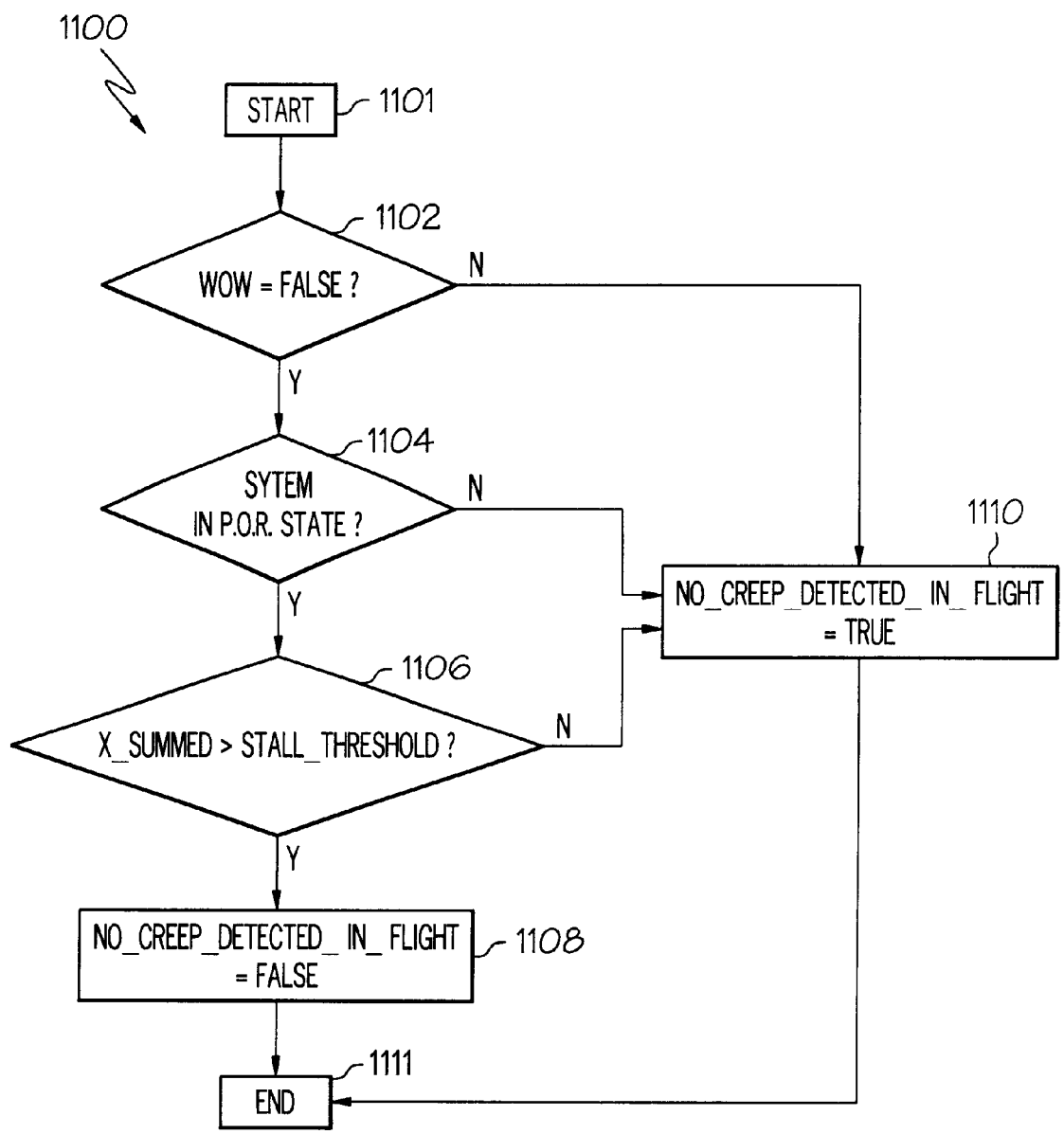
FIG. 11 is a flowchart depicting an exemplary method for detecting thrust reverser movement following an intermittent, in-flight power outage and subsequent power-on-reset event.
Figure 12:
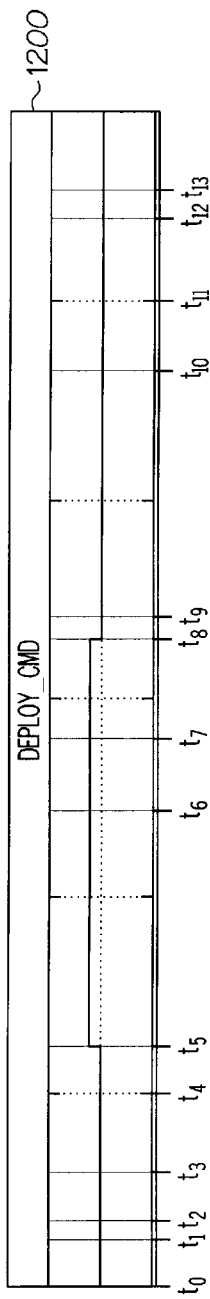
FIGS. 12–23 are exemplary timing diagrams illustrating various signals that are generated to implement a deploy/stow operation according to an exemplary embodiment of the present invention.
Figure 13:
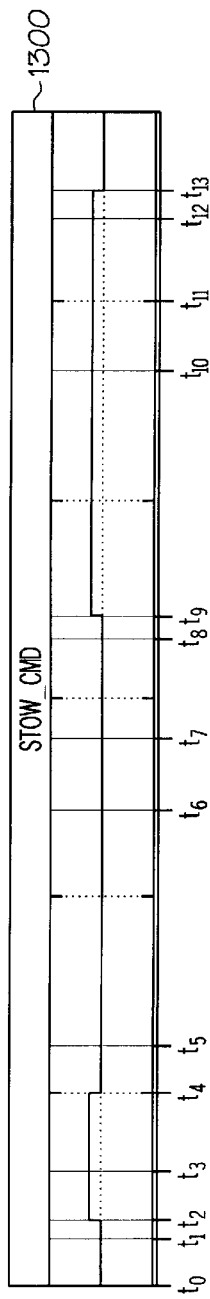
Figure 14:
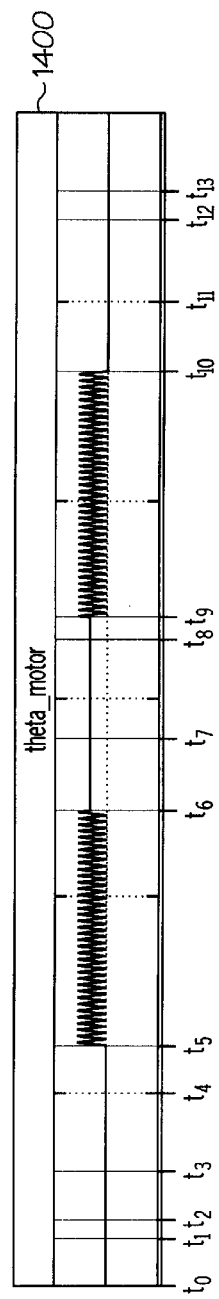
Figure 15:
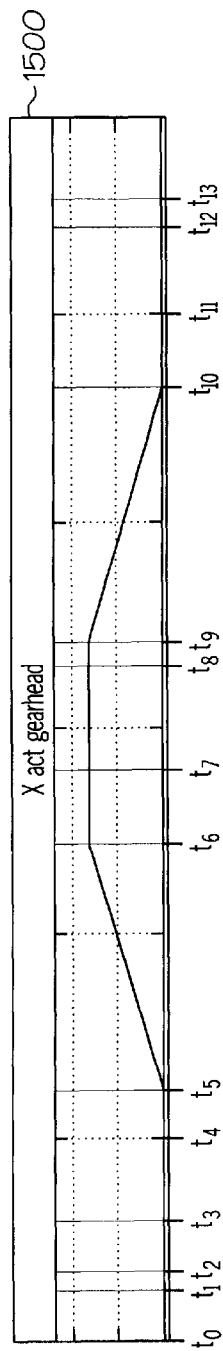
Figure 16:
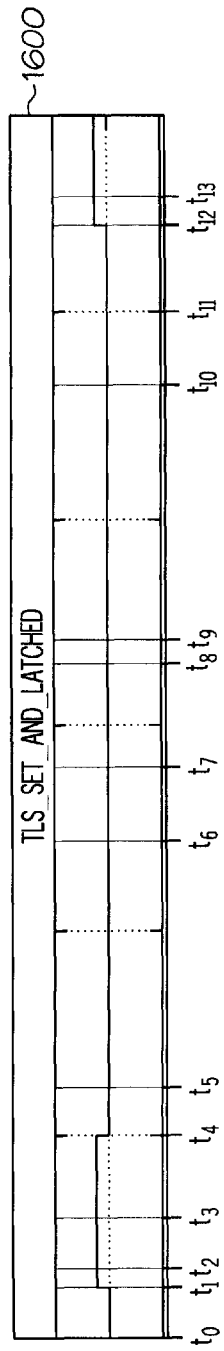
Figure 17:
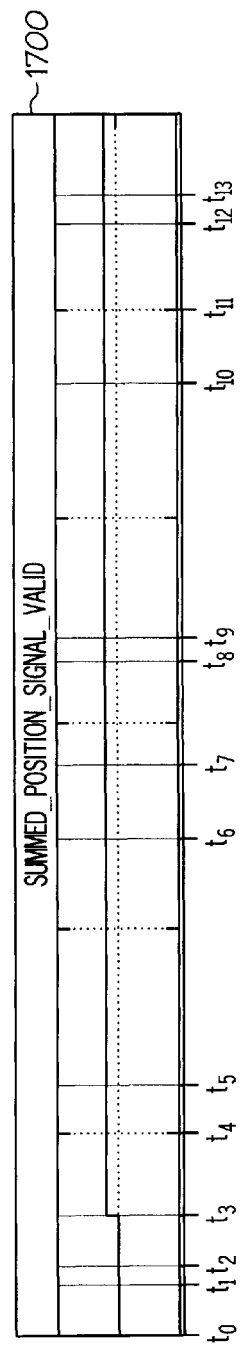
Figure 18:
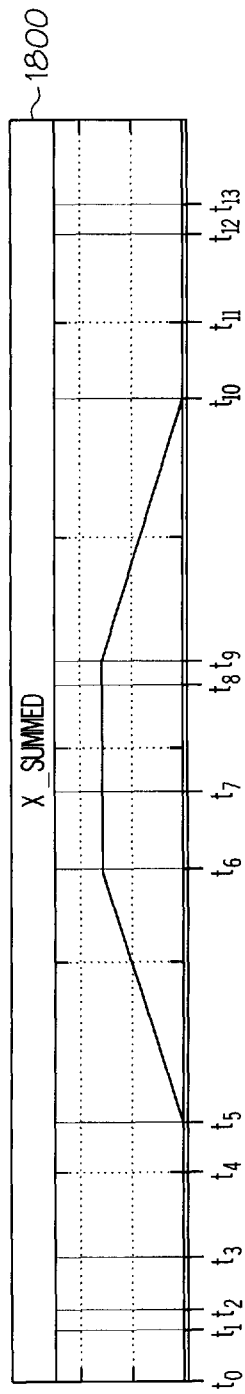
Figure 19:
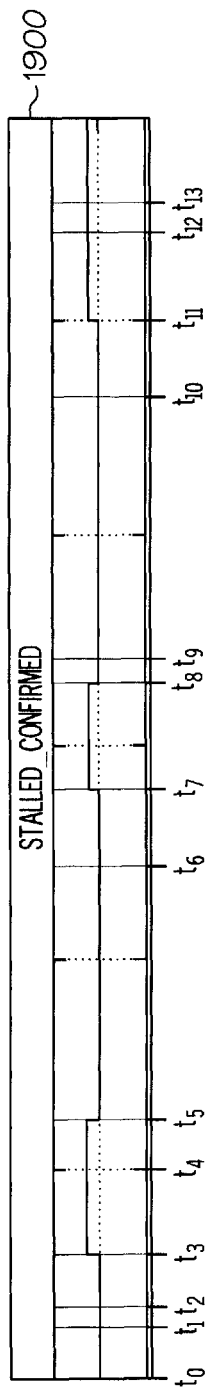
Figure 20:
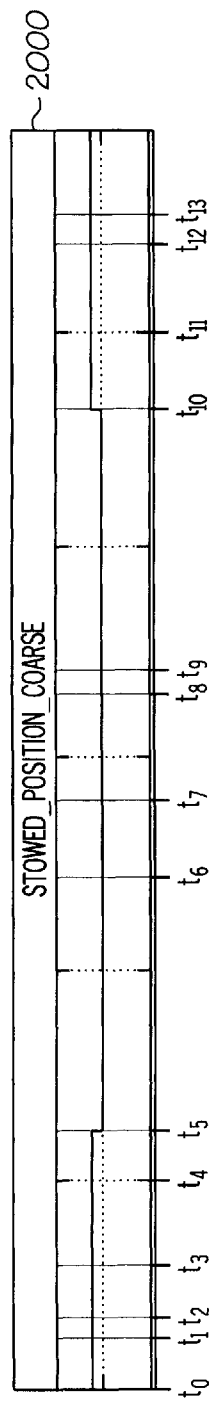
Figure 21:
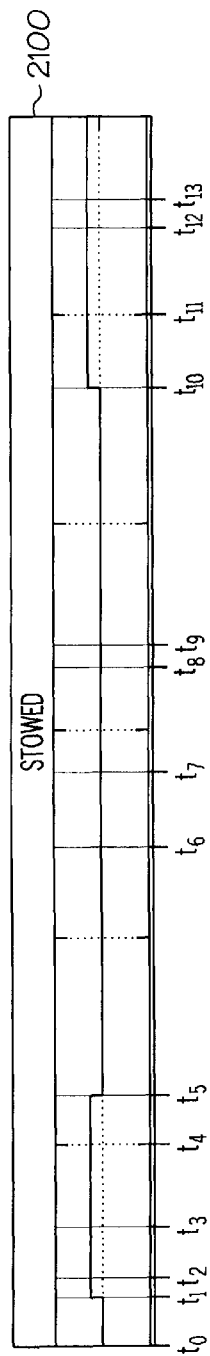
Figure 22:
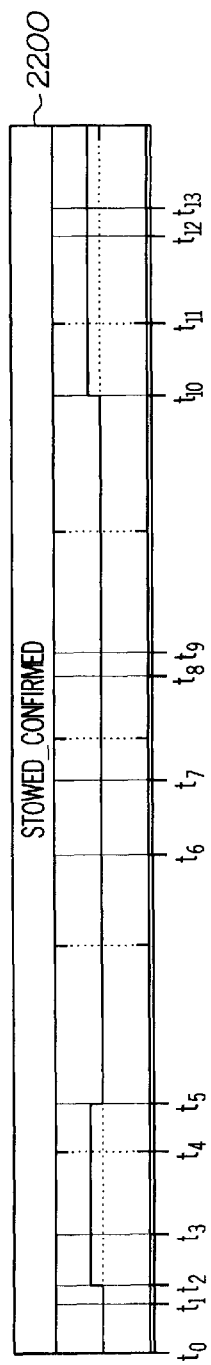
Figure 23:
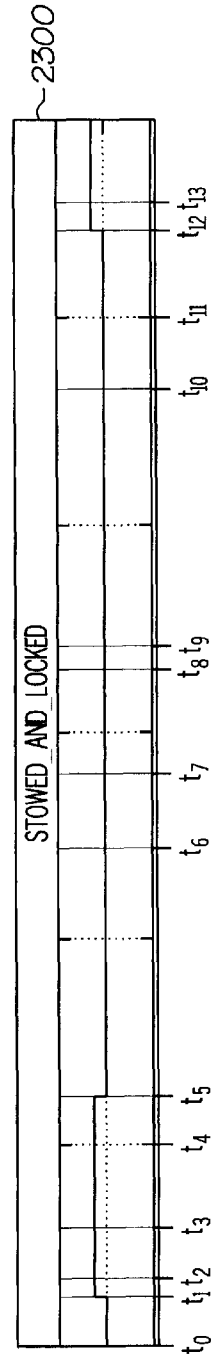

The creep detection algorithm, depicted in FIG. 11, provides an input to the above-described stow confirmation algorithm 1000 and is used to detect creep (e.g., slight movement) of the thrust reversers following an intermittent, in-flight power outage and subsequent POR event. The creep detection algorithm 1100 provides a simple and reliable indication of in-flight creep, and indicates any potential brake slip (if a brake is used as a primary or secondary lock). The creep detection algorithm 1100 first determines whether the aircraft is in flight (STEP 1102). Preferably, this is accomplished by a signal from a "Weight-On-Wheels" (WOW) detector 43 (see FIG. 4). If the aircraft is in flight, as indicated by the signal from the WOW detector, and a POR event occurs (1104), the thrust reverser control system 40, as was noted above, will be in the POR state 502. In this state, the motor summed position algorithm 600 is not considered valid. Nonetheless, the motor summed position algorithm 600 is still monitored because resetting the algorithm 600 is not necessary just to detect motion. If the algorithm 600 indicates thrust reverser movement that exceeds the STALL_THRESHOLD (STEP 1106), then it will indicate that in-flight creep was indeed detected.

The thrust reverser actuation control system 40 has been described from a detailed structural standpoint, and generally from a functional standpoint, and the individual algorithms used by the actuation control system 40 have also been described in detail. To provide further clarification of the operation of the actuation control system 40 and the algorithms used to implement the process whereby thrust reverser position is determined from motor position, a particular thrust reverser deploy/stow operation will be described. In this regard, reference should now be made to FIGS. 4–23 in combination, while this description is provided. It is noted that FIGS. 12–23 depict various signals generated by and supplied to the control unit 44 to implement the deploy/stow operation. It is noted that this description is predicated on the thrust reverser system initially being de-energized, with the transcowls 12 in the stowed and locked position, awaiting a deploy command.

At time $t_0$ the actuation control system is energized. This may occur following a normal power shutdown of the system 40 or following the above-described in-flight, intermittent power outage. In either case, when the actuation control system is energized (or re-energized, as the case may be), it undergoes a POR event and, as described above, is initially in the POR state 502.

Shortly after the actuation control system 40 is energized, at time $t_1$, the TLS_SET_AND_LATCHED signal 1600 goes to a logic high state, as would be expected since the tertiary locks 50 are indeed set and latched. In addition, because the signal supplied by backup position sensors 52 indicates that the thrust reversers are stowed, the STOWED_POSITION_COARSE signal 2000 is at a logic high state. Thus, the STOWED_AND_LOCKED signal 2300 from the thrust reverser stowed and locked algorithm 800 is also at a logic high state at this time. Because the other conditions needed to reset the motor summed position algorithm to zero and declare it valid are not met, the actuation control system 40 remains in the POR state 502. Thus, the SUMMED_POSITION_SIGNAL_VALID signal 1700 is at a logic low, and thrust reverser position is determined from the backup sensors 52.

At time $t_2$, the pilot initiates a thrust reverser stow command in the cockpit to zero the motor summed position algorithm 600. As a result, the STOW_CMD signal 1300 goes to a logic high, which in turn causes the motor 42 to rotate in the stow direction. Again, in an alternative embodiment, this stow rotation could be part of the overstow that occurs in response to a deploy command. In either case, because the thrust reversers are stowed and locked, the motor 42 does not rotate, or may rotate slightly, in the stow direction and the output signal 1400 from the resolver 54 or sensorless algorithm (THETA_MOTOR) is either zero or negligible. It is noted that the actuation control system 40 is at this point in the backup stow schedule state 506 (or alternatively in the backup deploy schedule state 504), which means the motor 42 is caused to rotate according to the backup stow speed schedule. In any event, the STOW__CMD signal 1300 is held high for a predetermined time period, which again, in the alternative embodiment, may be the predetermined overstow time period. During this time period, and specifically at $t_3$, the motor stall confirmation algorithm 900 causes the STALLED__CONFIRMED signal 1900 to go high. Thus, at this point in time, with the STOW__CMD signal 1300 high, the TLS__SET__AND__LATCHED signal 1600 high, and the STALLED__CONFIRMED signal 1900 high, the motor summed position reset algorithm 700 causes the SUMMED__POSITION__SIGNAL__VALID signal 1700 to go to a logic high, and the actuation control system 40 transitions to the motor summed position algorithm reset state 508. From this point on, thrust reverser position is now determined from the motor summed position algorithm 600. It is additionally noted that during this period of rotation in the stow direction, and specifically at time $t_4$, the tertiary locks 52 are released, causing the TLS__SET__AND__LATCHED signal 1600 to go low.

At time $t_5$, the stow command is released causing the STOW__CMD signal to go low, and a deploy command is initiated causing the DEPLOY__CMD signal 1200 to go high. Thus, actuation control system 40 transitions to the nominal deploy schedule state 510, which means the control unit 44 causes the motor 42 to rotate in the deploy direction using the nominal deploy speed schedule. Because the motor 42 begins to rotate, the resolver supplies the THETA__MOTOR output signal 1400 to the controller unit, and the STALLED__CONFIRMED signal 1900 goes low. Also at this time, the thrust reverser position signal supplied by the control unit 44 is based on a signal output of the motor summed position algorithm 600 (X__SUMMED) 1800.

The control unit 44 continues to rotate the motor 42 in the deploy direction until time $t_6$. At this time, the thrust reversers have reached the fully deployed position, and the motor 42 ceases its rotation. Shortly thereafter, at $t_7$, the motor stall confirmation algorithm 900 causes the STALLED__CONFIRMED signal 1900 to once again go high, until the DEPLOY__CMD signal 1200 goes low at $t_8$. At this point, the control unit 44 stops attempting to rotate the motor 42, and the STALLED__CONFIRMED signal 1900 goes low.

Then, at $t_9$, when the thrust reversers are no longer needed, the pilot initiates a stow command, which causes the STOW__CMD signal 1300 to once again go high. The actuation control system 40 transitions to the nominal stow speed schedule state 512, and the control unit 44 causes the motor 42 to rotate in the stow direction according to the nominal stow speed schedule. As the motor 42 begins to rotate, the resolver 54 supplies the THETA__MOTOR output signal 1400 to the control unit 44, and the thrust reverser position signal supplied by the control unit 44 is again based on the X__SUMMED signal 1600 output by the motor summed position algorithm 600.

The control unit 44 continues to rotate the motor 42 in the stow direction, and at time $t_{10}$ the X__SUMMED signal 1800 supplied by the motor summed position algorithm 600 indicates that the thrust reverser position is within the predetermined distance of the zero position. As a result, the stow confirmation algorithm 1000 supplies the STOW__CONFIRMED signal 2200. At the same time, or shortly before or after this time, the X__SENSOR signal indicates that the thrust reversers are at the stowed position, which causes the STOWED__POSITION__COARSE signal 2000 to also go high.

Upon reaching the stowed position, the motor 42 will stop rotating and the THETA__MOTOR output signal 1400 will go to zero. However, because the STOW__CMD signal is still high, the control unit 44 will continue to send a signal to the motor 42 to try and rotate it. During this time period, and specifically at $t_{11}$, the motor stall confirmation algorithm 900 will cause the STALLED__CONFIRMED signal 1900 to go high. And then at $t_{12}$, the tertiary locks 50 are set and latched causing the TLS__SET__AND__LATCHED signal 1600 to go high. At this point the thrust reverser stowed and locked algorithm 800 causes the STOWED__AND__LOCKED signal 2300 to go high. Then, at $t_{13}$, the STOW__CMD goes low, completing the operational deploy/stow cycle.

With the above-described embodiment, thrust reverser position is determined incrementally based on actuator motor revolutions. Using motor position to determine thrust reverser position is an incremental means of determining position, rather than a positional means which is employed by traditional position sensors. This provides highly accurate thrust reversr position information when compared with the accuracy provided by current position sensors. In addition, the described embodiment provides accurate position information without mounting additional position sensors on the gearhead reducer, thus decreasing the size, cost, and weight of the thrust reversers.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A system for determining the position of a jet engine thrust reverser component, comprising:
   a motor;
   at least one actuator coupled to the motor and operable to move the thrust reverser component in response to rotation of the motor;
   a first rotational position sensor operable to sense a rotational position of the motor and supply a first rotational position signal representative thereof; and
   a circuit coupled to receive at least the first rotational position signal and operable to determine thrust reverser component position based at least in part on the first rotational position signal.

2. The system of claim 1, wherein the circuit converts the first rotational position signal to thrust reverser component position according to a motor summed position algorithm.

3. The system of claim 1, wherein:
   the first rotational position signal includes information related to a rotational direction of the motor; and
   the circuit is further operable to determine thrust reverser component movement direction based at least in part on the first rotational position signal.

4. The system of claim 2, wherein the circuit converts the first rotational position signal to thrust reverser component position according to the motor summed position algorithm when the motor summed position algorithm is declared valid.

5. The system of claim 4, further comprising:
a second position sensor operable to sense a position of the actuator and supply a second position signal representative thereof to the circuit,
wherein the circuit is further operable to determine thrust reverser component position based on the second position signal.

6. The system of claim 4, wherein the circuit, in response to one of a stow command and a deploy command, is further operable to:
(i) activate the motor to rotate at a first speed when the motor summed position algorithm is declared valid, and
(ii) activate the motor to rotate at a second speed when the motor summed position algorithm is not declared valid, the second speed being lower than the first speed.

7. The system of claim 2, wherein the motor summed position algorithm:
counts revolutions of the motor based at least in part on the first rotational position signal; and
converts the counted motor revolutions into thrust reverser component position.

8. The system of claim 7, wherein the motor summed position algorithm counts motor revolutions by:
counting a number of complete motor revolutions;
determining whether the motor has rotated a fraction of a revolution; and
adding the determined fraction, if any, to the number of complete motor revolutions.

9. The system of claim 7, wherein the motor summed position algorithm counts motor revolutions by rounding the counted motor revolutions to the nearest integer value.

10. The system of claim 7, wherein the motor summed position algorithm further determines a rotational direction of the motor based at least in part on the first rotational position signal.

11. The system of claim 1, wherein the first rotational position sensor is a resolver.

12. The system of claim 1, wherein the motor is an electric motor.

13. A jet engine thrust reverser control system, comprising:
an electric motor;
at least one actuator coupled to the electric motor and operable to move a thrust reverser in response to rotation of the electric motor;
a first rotational position sensor operable to sense a rotational position of the electric motor and supply a first rotational position signal representative thereof; and
a control circuit coupled to receive at least the first rotational position signal and operable to determine thrust reverser position based at least in part on the first rotational position signal.

14. The system of claim 13, wherein the circuit converts the first rotational position signal to thrust reverser position according to a motor summed position algorithm.

15. The system of claim 13, wherein:
the first rotational position signal includes information related to a rotational direction of the electric motor; and
the circuit is further operable to determine thrust reverser movement direction based at least in part on the first rotational position signal.

16. The system of claim 14, wherein the circuit converts the first rotational position signal to thrust reverser position according to the motor summed position algorithm when the motor summed position algorithm is declared valid.

17. The system of claim 16, further comprising:
a second position sensor operable to sense a position of the actuator and supply a second position signal representative thereof to the circuit,
wherein the circuit is further operable to determine thrust reverser position based on the second position signal.

18. The system of claim 16, wherein the circuit, in response to one of a stow command and a deploy command, is further operable to:
(i) activate the electric motor to rotate at a first speed when the motor summed position algorithm is declared valid, and
(ii) activate the electric motor to rotate at a second speed when the motor summed position algorithm is not declared valid, the second speed being less than the first speed.

19. The system of claim 14, wherein the motor summed position algorithm:
counts revolutions of the electric motor based at least in part on the first rotational position signal; and
converts the counted motor revolutions into thrust reverser position.

20. The system of claim 19, wherein the motor summed position algorithm counts motor revolutions by:
counting a number of complete motor revolutions;
determining whether the electric motor has rotated a fraction of a revolution; and
adding the determined fraction, if any, to the number of complete motor revolutions.

21. The system of claim 19, wherein the motor summed position algorithm counts motor revolutions by rounding the counted motor revolutions to the nearest integer value.

22. The system of claim 19, wherein the motor summed position algorithm further determines a rotational direction of the electric motor based at least in part on the first rotational position signal.

23. The system of claim 13, wherein the first rotational position sensor is a resolver.

24. In a thrust reverser control system having a motor operably coupled to move a thrust reverser component between a stowed position and a deployed position, a method of determining jet engine thrust reverser component position, comprising:
rotating the motor;
counting revolutions of the motor; and
converting the counted motor revolutions into thrust reverser component position.

25. The method of claim 24, further comprising:
determining a rotational direction of the motor.

26. The method of claim 24, wherein the step of counting revolutions comprises:
counting a number of complete motor revolutions;
determining whether the motor has rotated a fraction of a revolution; and
adding the determined fraction, if any, to the number of complete motor revolutions.

27. The method of claim 24, wherein the step of counting revolutions comprises rounding the counted motor revolutions to the nearest integer value.

28. In a thrust reverser control system having a motor operably coupled to move a thrust reverser component between a stowed position and a deployed position, and that implements an algorithm to determine thrust reverser component position from a position of the motor, a method of declaring the algorithm valid, comprising:

rotating the motor to move the thrust reverser component toward the stowed position;

determining that the thrust reverser component is stowed; and declaring the algorithm valid when thrust reverser component stowage is determined.

29. The method of claim 28, wherein the step of determining that the thrust reverser component is stowed comprises determining that the thrust reverser component is locked in the stowed position.

30. The method of claim 28, wherein the step of determining that the thrust reverser component is stowed comprises determining that the motor is stalled.

31. The method of claim 30, wherein the step of determining that the motor is stalled comprises:

determining a rotational position of the motor from a motor rotational position signal;

filtering the motor rotational position signal to generate a filtered motor rotational position;

determining a difference magnitude between the motor rotational position and the filtered motor rotational position; and determining that the motor is stalled when the difference magnitude is less than a predetermined value.

32. The method of claim 31, wherein the step of determining that the motor is stalled further comprises determining that the difference magnitude is less than the predetermined value for a predetermined time period.

33. The method of claim 28, wherein the step of determining that the thrust reverser component is stowed comprises:

determining that a thrust reverser component stowage lock is engaged; and detecting that the thrust reverser component is in the stowed position using position sensor.

* * * * *